(12) United States Patent
Van Scoy

(10) Patent No.: US 6,408,563 B1
(45) Date of Patent: Jun. 25, 2002

(54) FISHING POLE ATTACHMENT FOR RETAINING FISHING LINE

(76) Inventor: Schuyler Allen Van Scoy, 201 Paseo Arboles, Suisun, CA (US) 94585

( * ) Notice: Subject to any disclaimer, the term of this patent is extended or adjusted under 35 U.S.C. 154(b) by 0 days.

(21) Appl. No.: 09/576,017

(22) Filed: May 23, 2000

(51) Int. Cl.$^7$ ............................................... A01K 97/06
(52) U.S. Cl. ................................................. 43/25.2
(58) Field of Search .................. 43/25, 25.2; D22/138, D22/139

(56) References Cited

U.S. PATENT DOCUMENTS

| | | | | |
|---|---|---|---|---|
| 404,747 A | * | 6/1889 | Teed | 43/25.2 |
| 468,227 A | | 2/1892 | Pflueger | |
| 718,589 A | | 1/1903 | Tredwell | |
| 802,027 A | * | 10/1905 | Bishop | 43/25 |
| 870,033 A | * | 11/1907 | Hildreth | 43/25.2 |
| 1,113,847 A | * | 10/1914 | Turner | 43/25 |
| 1,601,945 A | * | 10/1926 | Davis | 43/25.2 |
| 1,662,983 A | * | 3/1928 | Pflueger | 43/25.2 |
| 2,028,477 A | * | 1/1936 | Rupp | 43/25.2 |
| 2,464,880 A | | 3/1949 | McCombs | |
| 2,514,645 A | * | 7/1950 | Jardine | 43/25.2 |
| 2,527,625 A | * | 10/1950 | Fields | 43/25.2 |
| 2,725,660 A | | 12/1955 | Costley | |
| 2,791,054 A | * | 5/1957 | Gronek | 43/25.2 |
| 2,833,075 A | * | 5/1958 | Herron | 43/25.2 |
| 3,411,232 A | * | 11/1968 | Rumbaugh | 43/25.2 |
| 3,665,635 A | * | 5/1972 | Lumbard | 43/25.2 |
| 4,067,134 A | | 1/1978 | Billings | |
| 4,457,095 A | | 7/1984 | Stevenson | |
| 4,648,197 A | * | 3/1987 | Weiberg | 43/25 |
| 5,263,276 A | | 11/1993 | Washington | |

FOREIGN PATENT DOCUMENTS

| | | | | |
|---|---|---|---|---|
| CA | 451165 | * | 9/1948 | 43/25.2 |
| FR | 905606 | * | 10/1945 | 43/25.2 |

OTHER PUBLICATIONS

Popular Science, Jul. 1946, p. 196.*

* cited by examiner

*Primary Examiner*—Kurt Rowan
(74) *Attorney, Agent, or Firm*—Thomas R. Lampe

(57) ABSTRACT

A line holder of integral construction and including a straight portion and a bent portion is secured to a fishing pole. The bent portion can accommodate either a looped end of the fishing line or a hook on the line. A segment of the straight holder portion can be flexed away from the pole and when in unflexed condition clamps fishing line in place on the pole between the distal end of the pole and the handle end.

1 Claim, 2 Drawing Sheets

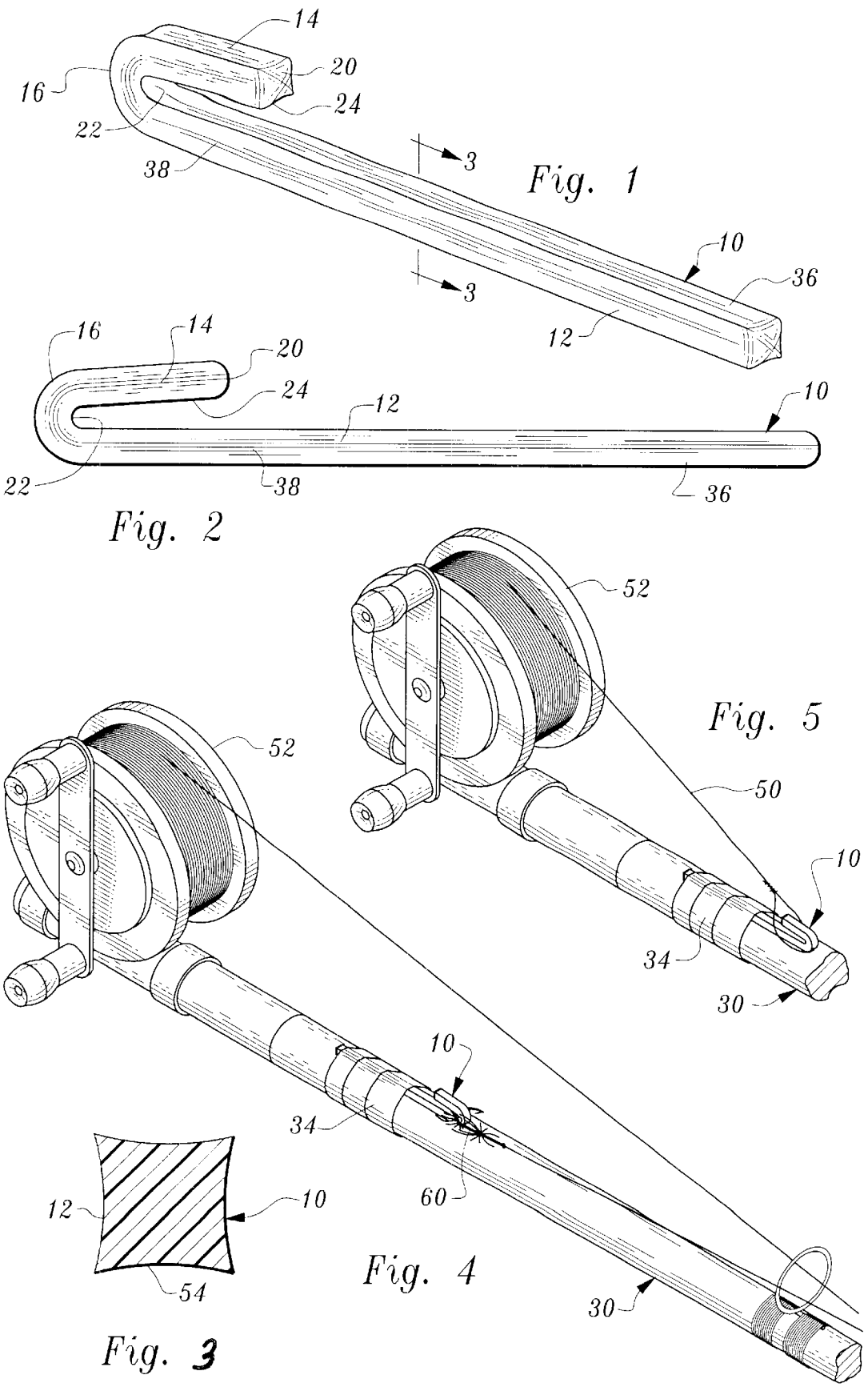

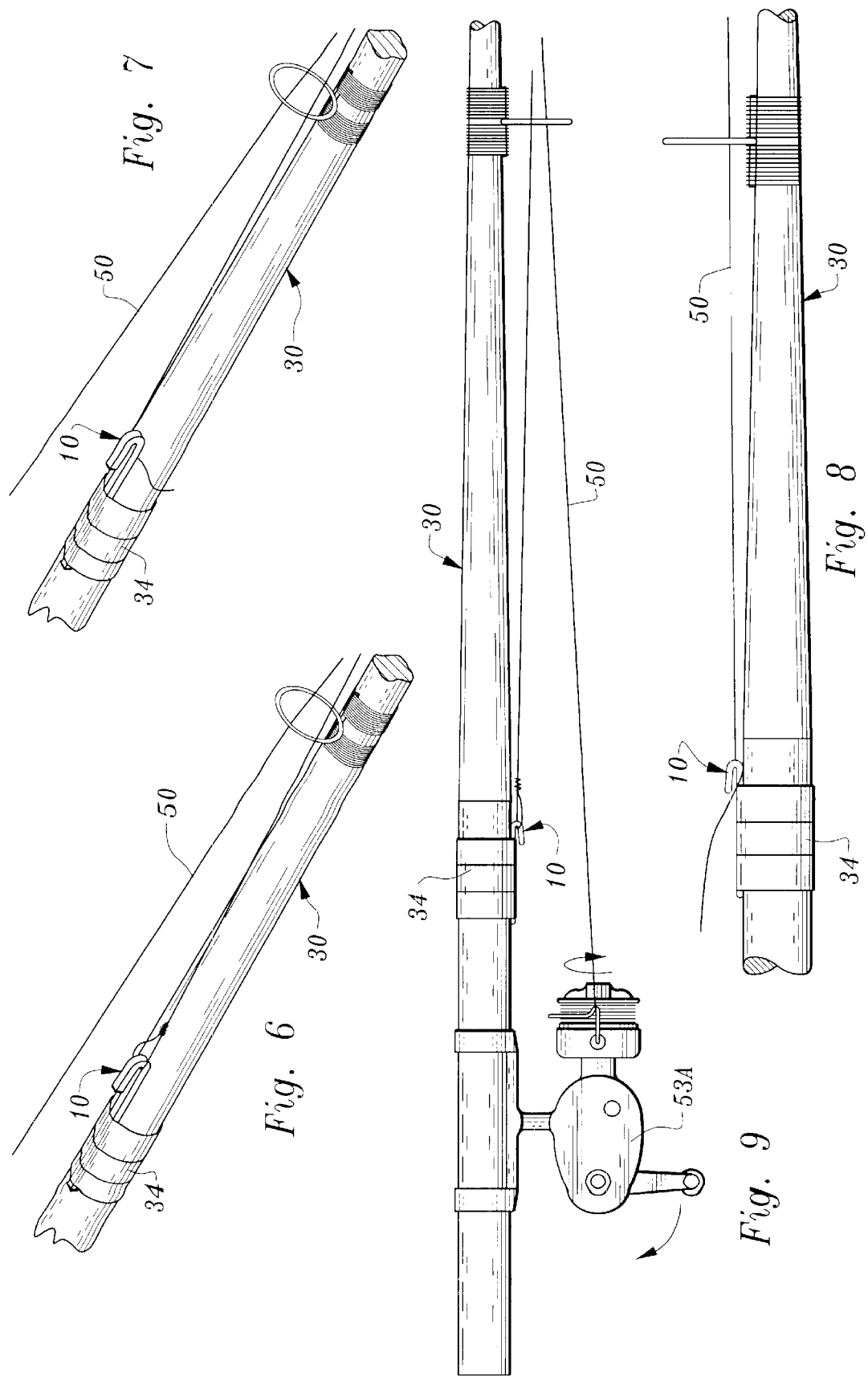

FISHING POLE ATTACHMENT FOR RETAINING FISHING LINE

TECHNICAL FIELD

This invention relates to fishing equipment and more particularly to apparatus for holding the free end of fishing line extending from a fishing reel at a location on a fishing pole.

BACKGROUND OF THE INVENTION

A number of devices or accessories have been devised in the past for temporarily holding the free end of a fishing line at a location on the fishing pole or on the fishing reel, the primary objective being to avoid tangling or fouling the line when the pole is not in use and to temporarily secure a hook if one is associated with the line for safety reasons. Of course, it is a well known practice simply to engage the hook with the structure of either the fishing reel or pole, for example the eye or guide of the pole, such practice being inadvisable since it can result in wearing or other damage to the hook or guide especially when there is metal to metal contact.

The following United States patents disclose arrangements for securing the free end of a fishing line when the fishing rod is not in use: U.S. Pat. No. 5,263,276, issued Nov. 23, 1993, U.S. Pat. No. 4,457,095, issued Jul. 3, 1984, U.S. Pat. No. 4,067,134, issued Jan. 10, 1978, U.S. Pat. No. 2,725,660, issued Dec. 6, 1955, U.S. Pat. No. 2,464,880, issued Mar. 22, 1949, U.S. Pat. No. 718,589, issued Jan. 13, 1903, and U.S. Pat. No. 468,227, issued Feb. 2, 1892.

None of the prior arrangements incorporate the structural and functional features of the apparatus disclosed and claimed herein.

DISCLOSURE OF INVENTION

The apparatus of the present invention encompasses a line holder which is characterized by its relative simplicity, low cost and versatility of use. The holder can be used to temporarily secure the free end of fishing line to a pole in several ways whether or not a hook is associated with the line. The apparatus is further characterized by its ease of use and the fact that it does not intrude or get in the way while fishing.

The fishing line holder is for use with a fishing pole having a handle end and a distal end and a fishing reel attached to the fishing pole at or closely adjacent to the handle end, the fishing reel having fishing line wound thereabout and extending therefrom, the fishing line having a free end.

The line holder is for attachment to the fishing pole between the fishing reel and the distal end of the fishing pole for releasably retaining the free end of the fishing line at a fixed location on the fishing pole between the fishing reel and the distal end of the fishing pole.

The line holder is of integral construction and includes a double-ended, straight, elongated first holder portion and a second holder portion attached to one of the ends of the straight, elongated holder portion.

The second holder portion defines a bend and doubles back along and adjacent to the first holder portion. The second holder portion has a free second holder portion end spaced from the location of attachment of the first holder portion and the second holder portion.

The first holder portion and the second holder portion define a recess therebetween for receiving the fishing line or a hook connected to the fishing line and the first holder portion and the second holder portion end define an opening communicating with the recess whereby the recess is open in the direction of the handle end of the fishing pole and may be entered from that direction.

Other features, advantages, and objects of the present invention will become apparent with reference to the following description and accompanying drawings.

BRIEF DESCRIPTION OF DRAWINGS

FIG. 1 is a perspective view of the line holder of the present invention;

FIG. 2 is a side elevational view of the line holder;

FIG. 3 is a greatly enlarged cross-sectional view taken along the line 3—3 in FIG. 1;

FIG. 4 is a perspective view illustrating a portion of a fishing pole having a fishing reel attached thereto and the line holder of the present invention secured to the pole and holding a fly hook at the end of the fishing line extending back toward the handle end of the pole from the distal end thereof;

FIG. 5 is a view similar to FIG. 4 but illustrating the line holder holding a looped end of fishing line extending directly from the fishing reel;

FIG. 6 is a perspective view illustrating a portion of a fishing rod having the line holder attached thereto and employed to hold the looped end of a fishing line extending back from the distal end of the pole;

FIG. 7 is a view similar to FIG. 6 but illustrating an unlooped end of the fishing line extending from the distal end of the pole clamped between the line holder and fishing pole;

FIG. 8 is a perspective view illustrating the clamp releasably holding line extending from the reel prior to the line passing through the first guide; and FIG. 9 is an elevational view illustrating a portion of a fishing pole having a different type of reel attached thereto at the handle end and the line holder holding a looped end of fishing line extending from the distal end of the fishing pole in the manner of FIG. 6.

BEST MODE FOR CARRYING OUT THE INVENTION

Referring now to FIGS. 1–7, a line holder 10 constructed in accordance with the teachings of the present invention is illustrated. The line holder 10 is of integral construction and is suitably formed of plastic, although metal could be utilized if desired.

The line holder 10 has two holder portions, namely, a double-ended, straight, elongated first holder portion 12 and a second holder portion 14 integrally attached to one of the ends of the holder portion 12.

The second holder portion defines a bend 16 and doubles back along and adjacent to the first holder portion.

The second holder portion has a free second holder portion end 20 spaced from the location of attachment of the first holder portion and the second holder portion. The first and second holder portions define a recess 22 therebetween for receiving fishing line or a hook connected to the fishing line. The hook may be a hook per se or a hook associated with a fishing fly or fishing plug.

The first holder portion 12 and the second holder portion end define an opening 24 communicating with the recess 22 whereby the recess is open in the direction of the handle end of a fishing pole to which it is attached and may be entered from that direction.

FIGS. 4–9 show the line holder 10 secured to a conventional fishing pole 30 at the handle end thereof by tape 34 wrapped about the first holder portion of the line holder and the pole. It should be noted that only a segment 36 of the first holder portion has tape wrapped therebout and it is only that segment of the first holder portion which is maintained by the tape in fixed position on the fishing pole and held immobile with respect thereto.

The remainder of the first holder portion, i.e. second segment 38 adjoining second holder portion 14, is unrestrained by the tape and can flex relative to the pole. Normally, the second segment 38 is in engagement with the pole except when an outside force pulling it away from the fishing pole is applied. If fishing line is placed between second segment 38 and the pole, resilient clamping forces are exerted on the line to releasably secure the fishing line between the second segment of the first holder portion and the fishing pole.

FIG. 5 shows a looped end of a fishing line 50 extending from fishing reel 52 clamped between second segment 38 of the first holder portion and the pole. FIG. 7 shows the fishing line 50 not having a tied loop formed therein clamped in position between the second segment 38 and the pole. The clamping function enables the device to be used as an "extra hand" or "line tender", temporarily capturing the fishing line. The arrangement of FIG. 7 is useful, for example, to temporarily hold the line when attaching, changing or removing terminal gear.

The arrangement of FIG. 8 is useful for temporarily capturing the fishing line between the reel and first guide when practicing the "free spool" or slack line fishing technique wherein no tension is exerted by the drag of the spool. When a fish bites, the fishing line will have a pulling force exerted thereon and the line will be pulled-out from under the second segment 38 of the first holder portion with only a slight tensional force being applied.

As best shown in FIG. 3, the first holder portion 12 has a plurality of concavely curved surfaces with a curved pole engagement surface 54 having a curvature generally corresponding to the curvature of the fishing pole at the location of the first holder portion. This ensures more area of contact between the first holder portion and the pole and results in the application of clamping forces over a bigger portion of the fishing line. Also, of course, this feature helps stabilize the first holder portion on the fishing pole when secured thereto.

FIG. 4 shows another capability of the apparatus. In FIG. 4 the hook of a fishing fly 60 is positioned in recess 22, the fishing line to which the fly is attached doubling back along the pole from the distal end thereof in a conventional manner. No contact is had between the hook and the pole and the hook is maintained very close to the pole so that snagging is not a problem.

FIG. 6 shows a situation wherein the end of the fishing line is in the form of a tied loop extending into the recess 22.

FIG. 9 shows an arrangement similar to that of FIG. 6 except that a spinning reel 52A is located at the handle end of the fishing pole.

The invention claimed is:

1. In combination:

a fishing pole;

a fishing reel attached to the fishing pole, said fishing reel having fishing line wound therebout and extending therefrom;

a line holder attached to said fishing pole adjacent to said fishing reel for releasably retaining said fishing line at a fixed location on said fishing pole adjacent to said fishing reel; and securement means securing said line holder to said fishing pole, said line holder being of integral construction and including a double-ended, straight, elongated first holder portion and a second holder portion attached to one of the ends of said straight, elongated holder portion, said second holder portion defining a bend and doubling back along and adjacent to said first holder portion, said second holder portion having a free second holder portion end spaced from the location of attachment of said first holder portion and said second holder portion, said first holder portion and said second holder portion defining a recess therebetween for receiving said fishing line or a hook connected to said fishing line, and said first holder portion and said second holder portion end defining an opening communicating with said recess whereby said recess is open, said first holder portion having first and second segments disposed end to end with said second segment being flexible and directly connected to said second holder portion, said securement means securing the first segment of said first holder portion in fixed position on said fishing pole and immovable with respect thereto, and said second segment of said first holder portion being in engagement with said fishing pole when in unflexed condition to exert opposed resilient clamping forces on fishing line disposed between said second segment of said first holder portion and said fishing pole to releasably secure the fishing line between said second segment of said first holder portion and said fishing pole, and said second segment of said first holder portion flexing relative to the first segment of said first holder portion and away from said fishing pole upon application of an outside force thereto, said first holder portion having a plurality of concavely curved surfaces with a curved pole engagement surface, the concave curvature said curved pole engagement surface generally corresponding to the curvature of said fishing pole at the location of said first holder portion.

* * * * *